United States Patent Office 3,507,854
Patented Apr. 21, 1970

---

3,507,854
PROCESS FOR PREPARING THIAMINE DERIVATIVES
Genshun Sunagawa, Hiroshi Watanabe, and Seiji Mitsui, Tokyo, Japan, assignors to Sankyo Company, Limited, Chyvo-ku, Tokyo, Japan
No Drawing. Filed Apr. 7, 1965, Ser. No. 446,403
Claims priority, application Japan, Apr. 8, 1964, 39/19,912
Int. Cl. C07d 51/51, 51/54, 99/12
U.S. Cl. 260—211.5     1 Claim This invention relates to a novel process for preparing thiamine derivatives. More particularly, this invention relates to a novel process for preparing thiamine derivatives having the formula

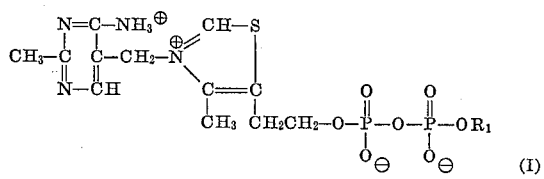

(I)

wherein $R_1$ is a member selected from the group consisting of hydrogen, the group

5'-adenosine and 5'-uridine.

Some of the thiamine derivatives having the above Formula I are known to be biochemically important compounds. For example, thiamine O-diphosphate has long been known to be a coenzyme and is designated cocarboxylase. Thiamine O-triphosphate is known to be a compound containing high energy phosphate bond and also reported to exist in the liver and muscle in mammals as well as in microorganisms, where it plays an important role, for example, as a source of high energy phosphate bond.

Heretofore, these known thiamine derivatives have been prepared by reacting thiamine with polyphosphoric acid derived from phosphoric acid; heating of the two gives a mixture of thiamine phosphates comprising thiamine O-monophosphate, thiamine O-diphosphate, thiamine O-triphosphate and thiamine O-polyphosphate. Each phosphate may be isolated from the reaction mixture. However, the above prior process is commerically unpractical, because yields of the phosphates isolated are extremely poor.

As a result of numerous studies in order to find a new and commercially practical method of preparing the thiamine phosphates, it has now been found that thiamine derivatives having the above Formula I of high purities may be prepared in excellent yields by reacting the thiol-type thiamine monophosphate with diphenyl (or dialkoxyphenyl) phosphorohalidate in the presence of a tertiary amine to form the thiol-type thiamine diphenyl (or dialkoxyphenyl) phosphate derivative, and reacting the latter derivative with a phosphate derivative in the presence of a tertiary amine followed by treatment with a mercapto-containing compound.

It is therefore an object of this invention to provide a novel and commercially practical process for preparing thiamine derivatives having the above Formula I.

Other objects of this invention will become apparent from the detailed descriptions of the invention.

According to the process of this invention, thiamine derivatives having the above Formula I are prepared by reacting a thiamine derivative having the formula

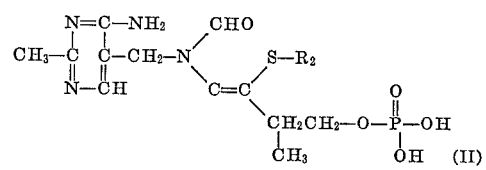

(II)

wherein $R_2$ is a member selected from the group consisting of aliphatic acyl group, aromatic acyl group, alkylthio group containing 1∼5 carbon atoms in the alkyl moiety and the group

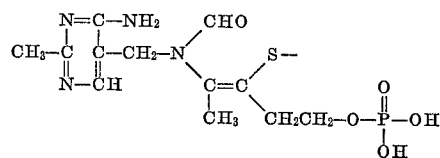

with a compound selected from the class consisting of diphenylphosphorohalidates and di(alkoxy-substituted phenyl)phosphorohalidates in the presence of a tertiary amine to form thiamine derivatives having the formula

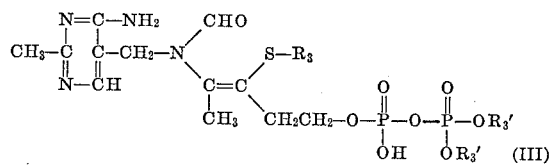

(III)

wherein $R'_3$ is a member selected from the group consisting of phenyl group and alkoxy-substituted phenyl groups and $R_3$ is a member selected from the group consisting of aliphatic acyl group, aromatic acyl group, alkylthio group containing 1∼5 carbon atoms in the alkyl moiety and the group

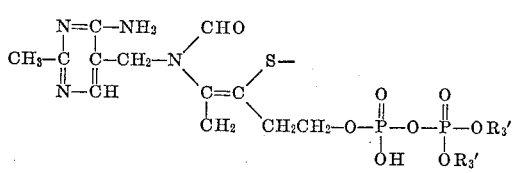

in which $R'_3$ is as defined above, and reacting the latter compound with a compound having the formula

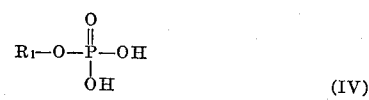

(IV)

wherein $R_1$ is as defined above in the presence of a tertiary amine followed by treatment with a compound containing mercapto group.

The reaction of the process according to this invention may be represented by the following equation:

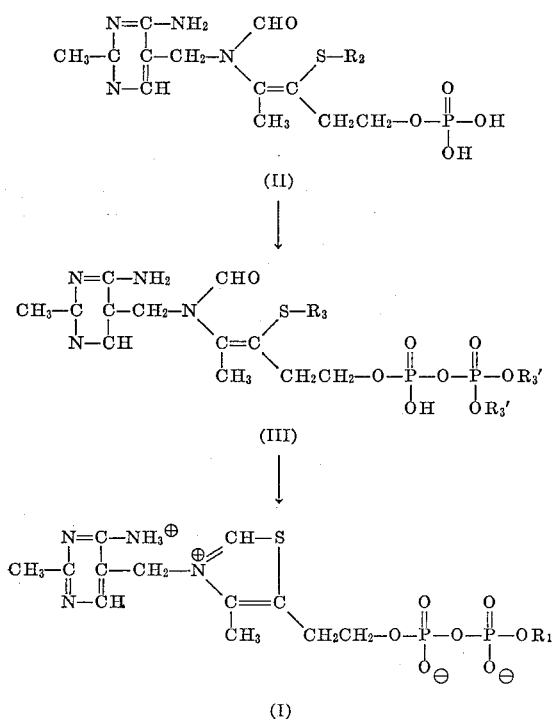

wherein $R_1$, $R_2$, $R_3$ and $R'_3$ are as defined above.

The first step in the process of this invention comprises reacting a thiamine derivative having the above Formula II with diphenylphosphorohalidate or di(alkoxy-substituted phenyl)phosphorohalidate in the presence of a tertiary amine to form a thiamine derivative having the above Formula III. In carrying out the above first step, a thiamine derivative having the above Formula II is dissolved or suspended in an organic solvent followed by addition of a tertiary amine and then water is stripped off from the resulting mixture by known procedures to form the substantially anhydrous mixture, to which is added a diphenylphosphorohalidate or a di(alkoxy-substituted)phosphorohalidate. There occurs a reaction of the latter with the said amine salt of thiamine derivative of the Formula II. Examples of especially suitable organic solvent are lower alkanols such as methanol and ethanol, amides such as dimethylformamide and formamide, cyclic ethers such as dioxane, dialkylsulfoxides such as dimethylsulfoxide and diethylsulfoxide and organic bases such as pyridine. The tertiary amine employed in the first step includes trialkylamine such as triethylamine, tributylamine, tri-(iso-octyl)-amine, tri-(n-octyl)-amine, tri-(iso-nonyl)-amine and N,N-didodecyl-N-n-butylamine, and dialkyl-monoaryl-amine such as dimethylphenylamine and diethylphenylamine.

The phosphorohalidate reactants may be diphenylphosphorohalidate and may also be diphenylphosphorohalidate substituted with one or more alkoxy groups containing 1~5 carbon atoms in each penyl moiety. Examples of the phosphorohalidate reactant are diphenylphosphorochloridate, diphenylphosphorobromidate, di(p-methoxyphenyl)phosphorochloridate and di(p-ethoxyphenyl)-phosphorobromidate. The time and temperature of the reaction are not critical features of this invention, and it is preferred to carry out the reaction at room temperature for from about 1 to 5 hours.

After completion of the reaction, the end product from the first step, a thiamine derivative having the above Formula II, may be easily recovered by any of the conventional methods, for example, by removal of the solvent from the reaction mixture and the product thus obtained may be employed for the subsequent second step in the present process either as it is or after further purification by known procedures.

The second step in the process of this invention comprises two stages, reaction of a thiamine derivative having the above Formula III obtained in the above first step with a phosphate derivative having the above Formula IV in the presence of a tertiary amine and treatment of the intermediate from the first stage with a compound containing mercapto group to produce the desired product, compounds having the above Formula I. In carrying out the above second step, the thiamine derivative resulted from the first step is dissolved or suspended in a suitable organic solvent, and the resulting mixture is treated with a phosphate derivative having the above Formula IV in the presence of a tertiary amine and an organic solvent, followed by treatment with a compound containing mercapto group. Examples of especially suitable organic solvent are those as mentioned regarding the above first step. Phosphate derivatives of the Formula IV include phosphoric acids such as phosphoric acid and pyrophosphoric acid, 5'-adenylic acid and 5'-uridylic acid.

The mercapto-containing compound employed in the latter stage of the second step may be any one containing mercapto group (—SH) in the molecule. Thus, the said mercapto-containing compound includes, for example, hydrogen sulfide; alkylmercaptans such as methyl mercaptan and ethyl mercaptan; aryl mercaptans such as thiophenol and α-(or β-)thionaphthol; mercapto-containing amino acids such as cysteine; and thioglycolic acid.

The time and temperature are not critical regarding both stages in the second step, and it is preferred to carry out the reaction at room temperature for from about 1 to 24 hours in the first stage and for the period of from about 1 to 4 hours at room temperature or under slight warming in the second stage.

After completion of the reaction, the end product from the second step may be recovered from the reaction mixture by any conventional method, for example, by removal of the solvent from the reaction mixture, and may be further purified by such a known procedure as removal of impurities with a suitable solvent e.g. methanol or ethanol or treatment with ion-exchange resin.

The following examples are given by way of illustration and not by way of limitation.

EXAMPLE 1

Preparation of thiamine O-triphosphate

To a suspension of 5 g. of S-benzoylthiamine O-monophosphate in methanol-ethanol is added 10 ml. of tri-(n-octyl)-amine. The mixture is concentrated to dryness, the residue is dissolved in anhydrous dioxane and the dioxane solution is again concentrated to dryness. The above-mentioned procedure is repeated three times whereupon a trace of water is removed from the dioxane solution.

To the anhydrous dioxane solution is added 3 ml. of diphnylphosphorochloridate and, after stirring, the resultant solution is allowed to stand at room temperature for 3 hours. The solvent is then removed from the reaction mixture by distillation under reduced pressure, the residue is stirred with anhydrous ether and then the solution is allowed to stand to separate a crystalline material, which is then recovered by filtration to give 6 g. of $P^2$-diphenyl S-benzoylthiamine O-pyrophosphate as a white powdery substance.

Analysis.—Calculated for $C_{31}H_{32}O_9N_4SP_2$ (percent): C, 53.20; H, 4.62; N, 8.02; P, 8.87. Found (percent): C, 51.50; H, 5.19; N, 8.67; P, 8.53.

The $P^2$-diphenyl S-benzoylthiamine O-pyrophosphate thus obtained (6 g.) is dissolved in dimethylformamide. To the solution is added a solution of 3.6 g. of pyrophosphoric acid in dioxane containing tri-(n-octyl)-amine and the mixture is vigorously shaken and then allowed to stand at room temperature overnight. The solvent is distilled off from the reaction mixture and the residue is treated with excess anhydrous ether to yield 5.3 g. of S-benzoylthiamine O-triphosphate as a white powdery substance. The S-benzoylthiamine O-triphosphate thus obtained (5 g.) is dissolved in a mixture of methanol and water (70:35), and 1 ml. of thiophenol is added to the solution, which is then neutralized to pH 6.5 with sodium hydroxide. The neutralized solution is warmed on a water bath at 50° C., allowed to stand at room temperature for 2 hours and then concentrated to leave a crystalline material, which is separated in the form of a long-needle and insoluble in water and soluble in ethanol. The crystalline material is removed by filtration and the mother liquor is freeze-dried to give 3.86 g. of powdery thiamine O-triphosphate with a purity of 75%.

One gram of the thiamine O-triphosphate is subjected to treatment with ion exchange resin to give 0.57 g. of the pure material, which is identified with the authentic sample by chromatography.

EXAMPLE 2

Preparation of thiamine O-diphosphate

S - benzoylthiamine O - diphosphate is prepared from S - benzoylthiamine O - monophosphate through $P^2$ - diphenyl S-benzoylthiamine O - pyrophosphate, by the same procedure as in Example 1.

The S - benzoylthiamine O - diphosphate thus obtained is converted to thiamine O-diphosphate with a purity of 90% in the same manner as in Example 1. Yield, 55%. The product thus obtained is identified with the authentic sample by chromatography.

EXAMPLE 3

Preparation of thiamine O-triphosphate

To a solution of bis - (thiamine O - monophosphate)-disulfide (1 mole) and tri-(n-octyl)-amine (4 moles) in dimethylformamide is added diphenylphosphorochloridate (6 moles).

The resulting mixture is treated as in Example 1 to give bis-($P^2$-diphenyl thiamine O-pyrophosphate)-disulfide.

The bis - ($P^2$ - diphenyl thiamine O - pyrophosphate)-disulfide thus obtained is dissolved in dimethylformamide and to the solution is added a solution of pyrophosphoric acid (8 moles) in dimethylformamide containing tri-(n-octyl)-amine. The mixture is stirred at room temperature for about 48 hours. The reaction mixture is filtered and the mother liquor is concentrated to dryness, and the residue is treated with anhydrous ether to give a white powder, which is dissolved in water. The aqueous solution is treated with cysteine as in Example 1 to give thiamine O-triphosphate, which is identified with that of Example 1 by chromatography.

EXAMPLE 4

Preparation of thiamine O-triphosphate

S - benzoylthiamine O - triphosphate (5 g.) is prepared from S - benzoylthiamine O - monophosphate (5 g.), by the same procedure as in Example 1.

A solution of the S - benzoylthiamine O - triphosphate thus obtained in methanol-water (70:35) is neutralized to pH 6.5 by addition of aqueous sodium hydroxide, and hydrogen sulfide is passed through the solution at 40~50° C. for 30 minutes. The methanol is then removed from the reaction mixture by distillation under reduced pressure and the residue is stirred in 20 ml. of ether. The aqueous layer is separated and made acidic to pH 2.7 by addition of 7 ml. of 80% formic acid. To the acid solution is added 20 ml. of ether, the mixture is stirred for a while, and the aqueous layer is separated and then freeze-dried to give crude thiamine O-triphosphate as a white powdery crystalline material. The crude product thus obtained is treated with ion exchange resin to give 1.8 g. of crystalline material with a purity of 85~90%, which is recrystallized from dilute ethanol to yield essentailly pure crystalline material.

Analysis.—Calculated for $C_{12}H_{19}N_4O_2P_2S \cdot 3H_2O$ (percent): C, 26.15; N, 4.80; N, 10.09; P, 15.85; $H_2O$, 9.68. Found (percent): C, 25.85; H, 4.48; N, 10.04; P, 16.67; $H_2O$, 9.68.

EXAMPLE 5

Preparation of thiamine O-triphosphate

A solution of S-benzoylthiamine O-triphosphate is prepared from S-benzoylthiamine O-monophosphate by the same procedure as in Example 4.

To the solution thus obtained is added 2.7 g. of β-thionaphthol and the mixture is warmed to 50° C. for 10 minutes. The crystalline material, which is precipitated in the reaction mixture, is removed by filtration and from the filtrate is removed the methanol. The residual solution is treated in the same manner as in Example 4 to give 1.7 g. of thiamine O-triphosphate with a purity of 85~90%.

EXAMPLE 6

Preparation of thiamine O-triphosphate

The same procedure as in Example 5 is repeated except that 1.6 g. of thioglycolic acid is employed instead of 2.7 g. of β-thionaphthol to yield 1.8 g. of thiamine O-triphosphate with a purity of 85~90%, which is identified with that of Example 5.

EXAMPLE 7

Preparation of thiamine adenosine diphosphate $P^2$ - diphenyl S - benzoylthiamine O - pyrophosphate is prepared from S - benzoylthiamine O - monophosphate, by the same procedure as in Example 1.

To a solution of the $P^2$-diphenyl S-benzoylthiamine O-pyrophosphate (1 mole) obtained as described above in dimethylformamide containing tri-(n-octyl)-amine is added a solution of 5′-adenylic acid (2 moles) in dimethylformamide containing tri-(n-octyl)-amine, and the mixture is allowed to stand at room temperature for about 48 hours. The solvent is removed from the reaction mixture by distillation and the residue is treated with ether to give a white gel-like substance, which is debenzoylated with cysteine as in Example 1 to give thiamine adenosine diphosphate; Rf value, 0.41 (n-propanol-0.5 N ammonium acetate 3:2; Rf value of thiamine O-monophosphate, 0.55 and Rf value of $P^2$-adenosine thiamine O-monophosphate, 0.49).

Analysis.—Calculated for $C_{22}H_{30}N_9O_{10}SP_2Cl \cdot 3H_2O$ (percent): N, 16.50; P, 8.11. Found (percent): N, 16.26; P, 7.98.

EXAMPLE 8

Preparation of thiamine uridine diphosphate $P^2$-diphenyl S-benzoylthiamine O-pyrophosphate is prepared from S-benzoylthiamine O-monophosphate (12.5 g.) by the same procedure as in Example 1.

To a solution of the $P^2$-diphenyl S-benzoylthiamine O-pyrophosphate obtained as described above in dimethylformamide containing tributylamine is added a solution of 17.5 g. of 5′-uridylic acid in dimethylformamide containing tributylamine, and the mixture is allowed to stand at room temperature for 2 hours. The solvent is removed from the reaction mixture by distillation, the residue is dissolved in aqueous methanol and the solution is treated with cysteine to give 30 g. of crude $P^2$-uridine thiamine O-diphosphate as a white powdery substance.

The substance thus obtained is treated with Dowex–1 (in the chlorine form; trade name of anion exchange resin manufactured and sold by Dow Chemical Company) to give 4.5 g. of pure thiamine uridine diphosphate as a white powdery substance, which is characterized by electrophoresis.

We claim:
1. A process for preparing a compound having the formula

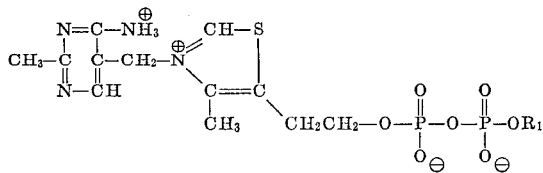

wherein $R_1$ is a member selected from the group consisting of hydrogen, the group

5'-adenosine and 5'-uridine which comprises reacting a compound having the formula

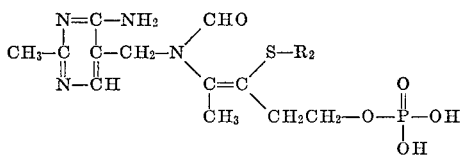

wherein $R_2$ is a member selected from the group consisting of aliphatic acyl of 2-4 carbon atoms, benzoyl alkylthio containing 1~5 carbon atoms in the alkyl moiety and the group

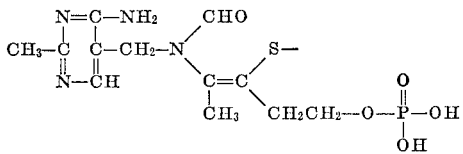

with a compound selected from the class consisting of diphenyl-phosphorohalidate and di($C_1$—$C_3$— alkoxy-substituted) phenylphosphorohalidate in the presence of a tertiary amine to form a compound having the formula

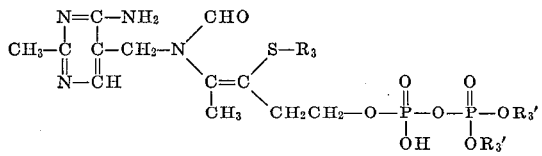

wherein $R'_3$ is a member selected from the group consisting of phenyl and alkoxy-substituted phenyl having 1–3 carbon atoms in the alkoxy moiety and $R_3$ is a member selected from the group consisting of aliphatic acyl, aromatic acyl alkylthio containing 1~5 carbon atoms in the alkyl moiety and the group

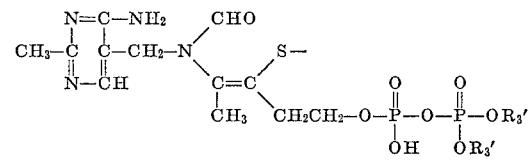

in which $R'_3$ is as defined above, and reacting the latter compound with a compound having the formula

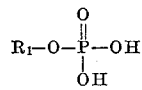

wherein $R_1$ is as defined above in the presence of a tertiary amine followed by treatment with a compound selected from the group consisting of hydrogen sulfide, an alkylmercaptan, an arylmercaptan, a mercapto-containing amino acid and thioglycolic acid.

References Cited
UNITED STATES PATENTS

| | | | |
|---|---|---|---|
| 2,645,637 | 7/1953 | Todd et al. | 260—211.5 |
| 2,734,902 | 2/1956 | Kuijvenhoven et al. | 260—256.6 |
| 2,991,284 | 7/1961 | Wenz et al. | 260—256.6 |
| 3,290,285 | 12/1966 | Senoo et al. | 260—211.5 |

JAMES O. THOMAS, Jr., Primary Examiner

U.S. Cl. X.R.
260—256.5, 256.6